Aug. 31, 1954

K. J. G. BROBERG 2,687,686

VENTILATING GRILL

Filed July 12, 1952

Inventor:
Karl Johan Georg Broberg
by his Attorneys
Howson &
Howson

Aug. 31, 1954 K. J. G. BROBERG 2,687,686
VENTILATING GRILL
Filed July 12, 1952
2 Sheets-Sheet 2
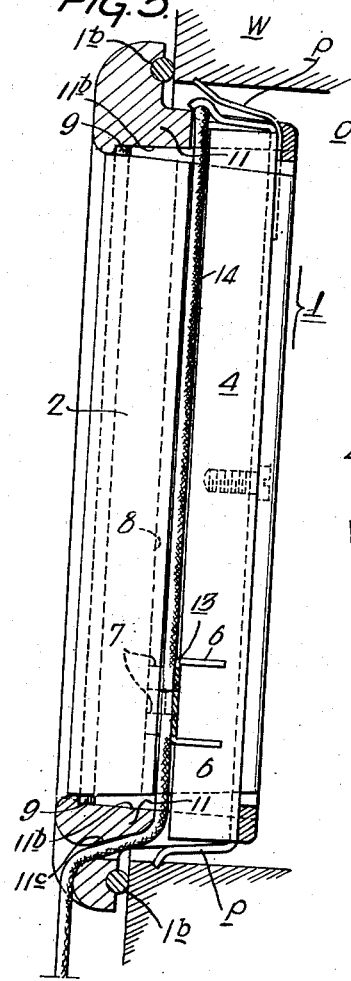
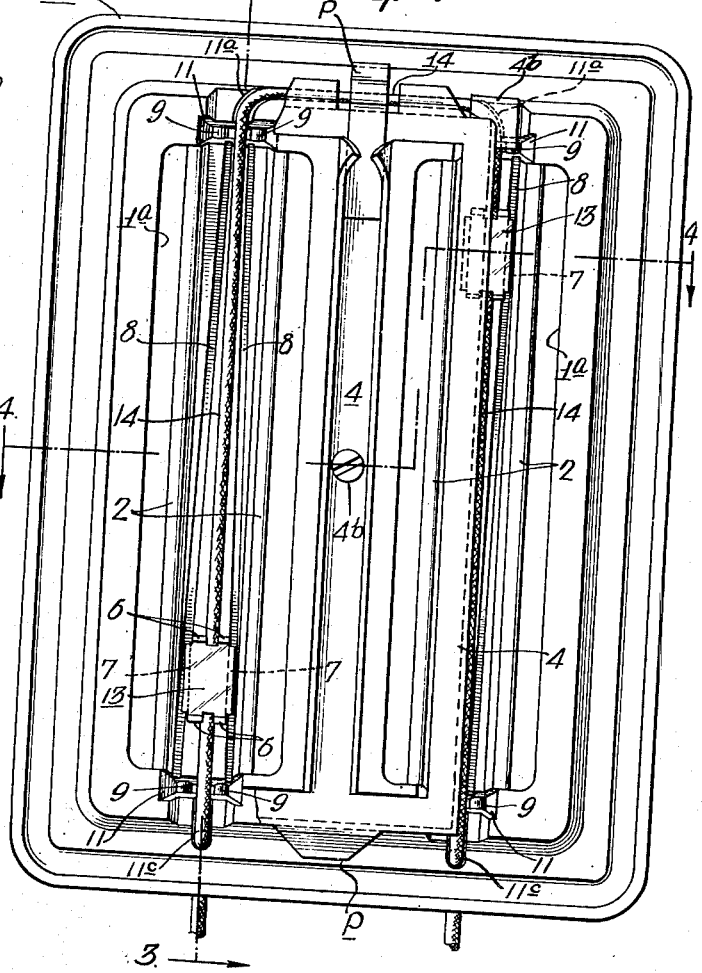
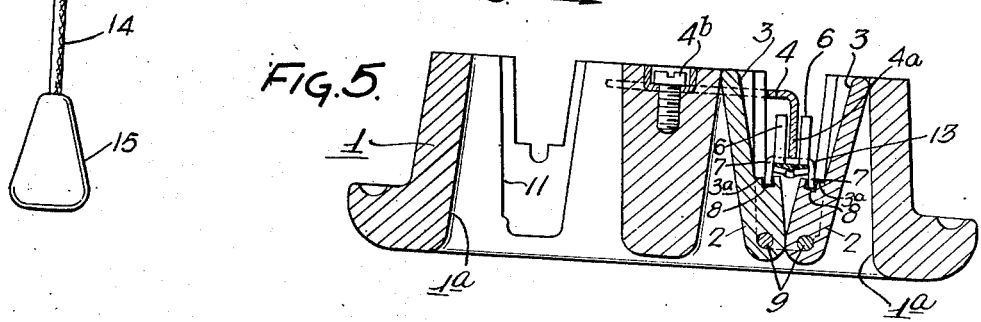
Inventor:
Karl Johan Georg Broberg
by his Attorneys
Howson & Howson Patented Aug. 31, 1954

2,687,686

UNITED STATES PATENT OFFICE 2,687,686

VENTILATING GRILL

Karl Johan Georg Broberg, Solna, Sweden, assignor to AB Svenska Flaktfabriken, Stockholm, Sweden Application July 12, 1952, Serial No. 298,523
Claims priority, application Sweden July 12, 1951

5 Claims. (Cl. 98—110)

This invention relates to new and useful improvements in shutter-type ventilating grills. More particularly, the invention relates to a novel construction and arrangement of shutters and actuating means therefor which may be employed generally in ventilating grills and especially in instances where conventional constructions and mechanisms cannot practically be employed.

These and other features of the invention and the various details of the construction and operation thereof are hereinafter fully set forth and described with reference to the accompanying drawings, in which:

Fig. 2 is a rear elevational view of the grill illustrated in Fig. 1, a part of the cover bracket being broken away to better illustrate certain details of the construction;

Fig. 3 is a sectional view on line 3—3, Fig. 2;

Fig. 5 is a sectional view similar to Fig. 4 but reversed and showing one pair of shutters in extended relation closing the frame opening, the other pair of shutters and the actuating mechanism therefor being omitted.

Figure 1:
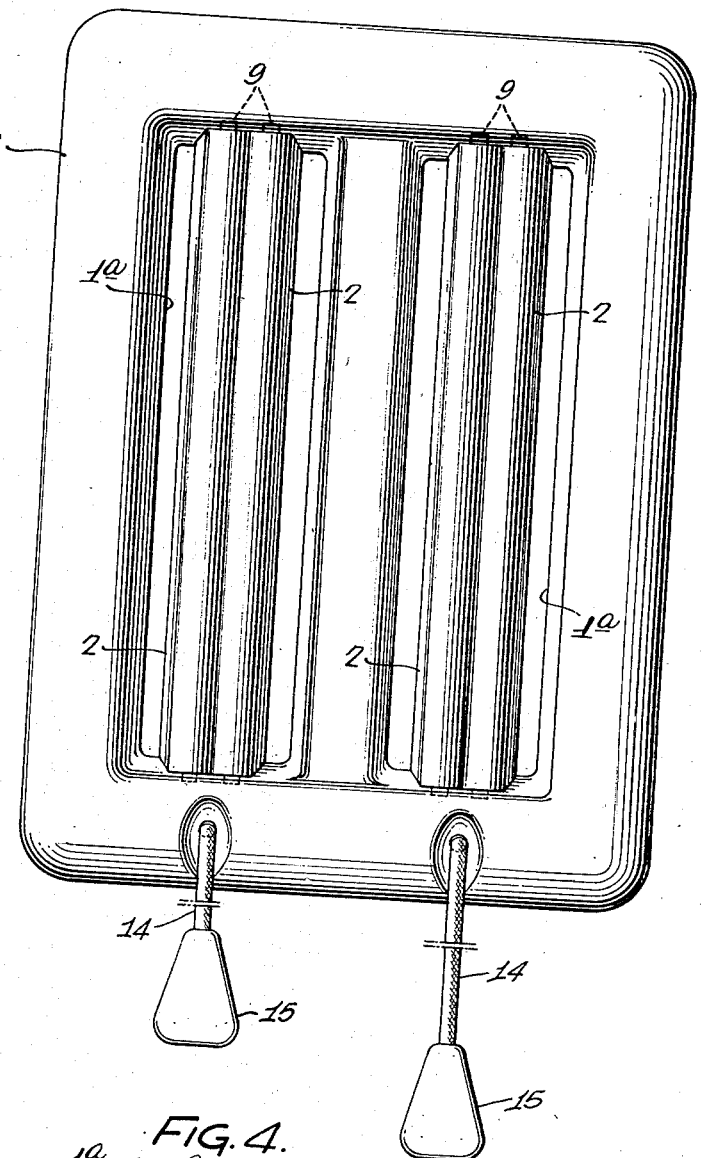
Fig. 1 is a front elevational view of a ventilating grill embodying the present invention.

Referring to the drawings, reference numeral 1 designates the frame of a ventilating grill having a plurality of openings 1a therein disposed in parallel spaced relation to each other, for example, vertically in the frame 1 as shown. The frame 1 is intended to be mounted in an opening O in a wall or other structure W by means of prongs P which interengage the opposite wall surfaces of the opening O, for example, as shown in Fig. 3 of the drawings. The frame carries the usual gasket 1b to provide a seal between the frame 1 and wall surface W.

In each grill opening 1a there is mounted a pair of shutters 2 which extend longitudinally throughout the length or height of the grill opening, the shutters 2 of each pair being adapted to be moved between relatively extended and contracted positions to close and open the openings 1a in the frame 1. To accomplish this, each shutter is pivotally mounted in the grill opening 1a by means of a pin 9 which extends longitudinally through the shutter adjacent and along one edge thereof and has its opposite ends rotatably seated in recesses 11b in the top and bottom portions 11 of the frame 1. The portion of the shutter 2 through which the pin 9 extends is relatively thicker than the remaining portion of the shutter which is recessed at one side as indicated at 3 to provide a shoulder surface 3a at right angles to the general plane of the shutter for a purpose that will later appear. As shown in the drawings the pairs of shutters are mounted centrally in the grill openings 1a with their respective recesses 3 disposed in inwardly facing relation to each other and with their pivoted edge portions contiguous. The pivoted edge portions of the shutters 2 are rounded as indicated at 2a so that the shutters of each pair may be pivoted about the axes of their pins 9 in respectively opposite directions.

Mechanism is provided for pivotally actuating the shutters 2 of each pair simultaneously toward and away from one another between their extended and retracted positions to open and close the openings 1a in the frame 1. To this end there is provided in the shoulder surface 3a of each shutter 2 a groove 8 which extends the entire length of the shutter. As shown most clearly in Fig. 4 of the drawings, the groove 8 in each shutter is disposed at an angle to the general plane of the shutter and the grooves 8 in the shutters of each pair thereof are arranged so that they are disposed, for example, in upwardly divergent relation in the case of the right hand pair of shutters in Fig. 4 and in upwardly convergent relation in the case of the grooves in the left hand pair of shutters in Fig. 4.

Slidably mounted in the grooves 8 of each pair of shutters 2 are the spaced projecting lugs 7 of an actuator member 13. The actuator members 13 in turn are retained in sliding engagement in the shutter grooves 8 by the edge flanges 4a of a bracket 4 which is secured, for example, by a screw 4b to the front face of the grill frame 1. The edge flanges 4a are received between horizontally and vertically spaced projecting guide elements 6 on the members 13 and serve to retain the latter engaged in the grooves 8 while permitting free sliding movement of said members 13 longitudinally of the shutters 2 and flanges 4a.

The angular relationship of the grooves 8 in each pair of shutters is such that sliding movement of the actuator members therein operates to pivot the shutters of each pair in respectively opposite directions between their relatively extended and retracted positions and thereby close and open the grill openings 1a according to the direction of sliding movement of the actuator member 13. More particularly, the angular relationship of the shutter grooves 8 is such that in the right hand pair of shutters in Fig. 2 the shutters will be in fully retracted relation with respect to the frame opening 1a when the member 13 is at the upper limit of its travel and will be in fully extended relation with respect to the frame opening 1a, as shown at the right in Fig. 5, when the member 13 is at the lower limit of its travel in the grooves 8.

Figure 4:
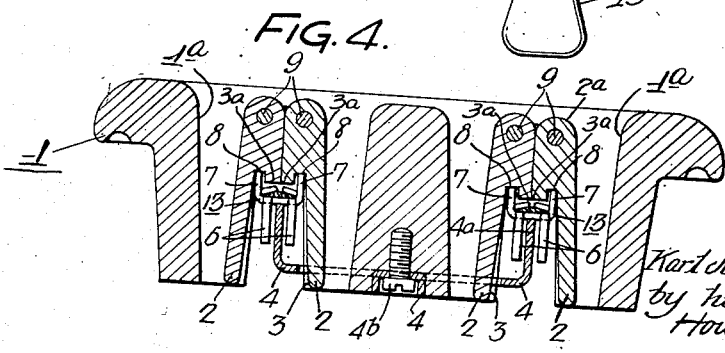
Fig. 4 is a sectional view on line 4—4, Fig. 2.

In the embodiment of the invention shown in the drawings the adjacent pairs of shutters 2 are intended to be opened and closed simultaneously. To this end the grooves 8 in the left hand pair of shutters on Fig. 4 are convergent in the opposite direction from the grooves 8 in the right hand pair of shutters and the members are actuated in respectively opposite directions by a single pull cord 14 which is connected to both actuator members 13 and has its intermediate portion extending from one pair of shutters to the other as shown in said Fig. 4. More particularly, the intermediate and free end portions of the pull cord 14 extend through guide passages 11a and 11c formed in the top and bottom portions 11, respectively, of the frame 1 and the bracket 4 includes top corner portions 4b which cover the guide passage 11a in the frame top portions 11 to prevent displacement of the pull cord 14. The ends of the cord hang suspended below the frame 1 as shown and knobs 15 to facilitate actuation of the pull cord may be provided.

By virtue of the construction and arrangement of the shutter grooves 8, actuator members 13 and common pull cord, it will be observed with reference to Fig. 4 of the drawings that when the right hand end of cord 14 is pulled downwardly the actuator members 13 for the right and left hand pairs of shutters will be actuated downwardly and upwardly, respectively, to cause the shutters 2 of both pairs thereof to be retracted thereby opening the grill opening 1a. Conversely, when the left hand end of the cord 14 is pulled downwardly the members 13 are actuated in the reverse directions to pivot the shutters 2 of each pair outwardly to their relatively extended positions and thereby close the grill opening 1a.

While a particular embodiment of the invention has been illustrated and described herein it is not intended that the invention be limited to such disclosure and changes and modifications may be made within the scope of the following claims.

I claim:

1. A ventilating grill comprising a frame having an opening therein, a pair of shutters pivotally mounted centrally in said opening in the frame and extending the full length of the opening, the shutters of said pair being individually mounted for pivotal movement in respectively opposite directions and disposed with respect to each other so that in the relatively extended and retracted positions thereof the grill opening is closed and opened, respectively, said shutters each having an angularly extending groove therein and the grooves in the pair of shutters being disposed in divergent-convergent relation longitudinally thereof, and an actuator member slidably mounted in the grooves of said pair of shutters operable upon movement of the member longitudinally of the shutters in the direction of divergence of said grooves to retract said shutters and upon movement in the direction of convergence of the grooves to extend the shutters.

2. A ventilating grill comprising a frame having an opening therein, a pair of shutters pivotally mounted centrally in said opening in the frame and extending the full length of the opening, the shutters of said pair being individually mounted for pivotal movement in respectively opposite directions and disposed with respect to each other so that in the relatively extended and retracted positions thereof the grill opening is closed and opened, respectively, said shutters each having an angularly extending groove therein and the grooves in the pair of shutters being disposed in divergent-convergent relation longitudinally thereof, an actuator member slidably mounted in the grooves of said pair of shutters operable upon movement of the member longitudinally of the shutters in the direction of divergence of said grooves to retract said shutters and upon movement in the direction of convergence of the grooves to extend the shutters, and means to actuate said actuator member.

3. A ventilating grill comprising a frame having at least two parallel spaced openings therein, a pair of shutters pivotally mounted centrally in each opening in the frame and extending the full length of the opening, the shutters of each pair being individually mounted for pivotal movement in respectively opposite directions and disposed with respect to each other so that in the relatively extended and retracted positions thereof the grill openings are closed and opened respectively, said shutters each having an angularly extending groove therein and the grooves in the shutters of each pair thereof being disposed in divergent-convergent relation longitudinally of the shutters with the grooves in adjacent pairs of shutters being divergent-convergent in respectively opposite directions, and an actuator member slidably mounted in the grooves of each pair of shutters operable upon movement of the member longitudinally of the shutters in the direction of divergence of said grooves to retract said shutters and upon movement in the direction of convergence of the grooves to extend the shutters.

4. A ventilating grill comprising a frame having at least two parallel spaced openings therein, a pair of shutters pivotally mounted centrally in each opening in the frame and extending the full length of the opening, the shutters of each pair being individually mounted for pivotal movement in respectively opposite directions and disposed with respect to each other so that in the relatively extended and retracted positions thereof the grill openings are closed and opened respectively, said shutters each having an angularly extending groove therein and the grooves in the shutters of each pair thereof being disposed in divergent-convergent relation longitudinally of the shutters with the grooves in adjacent pairs of shutters being divergent-convergent in respectively opposite directions, an actuator member slidably mounted in the grooves of each pair of shutters operable upon movement of the member longitudinally of the shutters in the direction of divergence of said grooves to retract said shutters and upon movement in the direction of convergence of the grooves to extend the shutters, and means to actuate said actuator members.

5. A ventilating grill comprising a frame having at least two parallel spaced openings therein, a pair of shutters pivotally mounted centrally in each opening in the frame and extending the full length of the opening, the shutter of each pair being individually mounted for pivotal movement in respectively opposite directions and disposed with respect to each other so that in the relatively extended and retracted positions thereof the grill openings are closed and opened respectively, said shutters each having an angularly extending groove therein and the grooves in the shutters of each pair thereof being disposed in divergent-convergent relation longitudinally of the shutters with the grooves in adjacent pairs of shutters being divergent-convergent in respectively opposite directions, an actuator member slidably mounted in the grooves of each pair of shutters operable upon movement of the member longitudinally of the shutters in the direction of divergence of said grooves to retract said shutters and upon movement in the direction of convergence of the grooves to extend the shutters, and a common pull cord having parallel portions thereof secured respectively to the actuator member of one pair of shutters and operable to effect simultaneous movement of said actuator members in respectively opposite directions and cause extension and retraction of the pairs of shutters in unison.

References Cited in the file of this patent

UNITED STATES PATENTS

| Number | Name | Date |
|---|---|---|
| 2,345,503 | Reece | Mar. 28, 1944 |